(12) United States Patent
Kim et al.

(10) Patent No.: US 6,507,548 B1
(45) Date of Patent: Jan. 14, 2003

(54) OPTICAL PICKUP DEVICE

(75) Inventors: Jong-ryull Kim, Suwon (KR); Kun-soo Kim, Suwon (KR); Myong-soo Choi, Suwon (KR); Hyung-taek Oh, Suwon (KR); Jong-hwa Yu, Suwon (KR)

(73) Assignee: Samsung Electronics Co., Ltd. (KR)

( * ) Notice: Subject to any disclaimer, the term of this patent is extended or adjusted under 35 U.S.C. 154(b) by 156 days.

(21) Appl. No.: 09/592,433

(22) Filed: Jun. 12, 2000

(30) Foreign Application Priority Data

Jun. 10, 1999 (KR) ............................................. 99-21553
Jun. 5, 2000 (KR) ............................................. 00-30795

(51) Int. Cl.$^7$ ................................................. G11B 7/00
(52) U.S. Cl. ................................. 369/112.01; 369/53.1
(58) Field of Search ............................ 369/53.11, 47.5, 369/116, 94, 53.1, 112.01, 112.05

(56) References Cited

U.S. PATENT DOCUMENTS 6,026,071 A * 2/2000 Kimura ....................... 369/112
6,222,814 B1 * 4/2001 Ichimura ..................... 369/112
6,304,533 B2 * 10/2001 Toda et al. .................. 369/112

FOREIGN PATENT DOCUMENTS

| JP | 5-314529 | 11/1993 |
| JP | 7-65400 | 3/1995 |
| JP | 7-26912 | 5/1995 |
| JP | 7-230628 | 8/1995 |
| JP | 8-153336 | 6/1996 |

* cited by examiner

Primary Examiner—Nabil Hindi
(74) Attorney, Agent, or Firm—Burns, Doane, Swecker & Mathis, LLP

(57) ABSTRACT

An optical pickup device includes a light source for emitting light, a beam splitter installed on an optical path of the light emitted from the light source for splitting the light, an objective lens for focusing a main light split by the beam splitter at an optical disk, a monitoring photodetector for receiving a sub-light split by the beam splitter and monitoring the amount of light output from the light source, a main photodetector for receiving the light emitted from the light source and reflected by the optical disk and passing through the beam splitter and detecting an error signal and an information signal, and a collimating lens installed on the optical path between the light source and the beam splitter for focusing both the main light and sub-light split by the beam splitter, so that the amount of light received by the monitoring photodetector increases.

8 Claims, 4 Drawing Sheets

FIG. 1 (RPIOR ART)

OPTICAL PICKUP DEVICE

BACKGROUND OF THE INVENTION

1. Field of the Invention

The present invention relates to an optical pickup device for writing and reading information on and from a recording medium by emitting light to the optical recording medium.

2. Description of the Related Art

A typical optical pickup device is for writing and reading information on and from an optical recording medium in a non-contact manner. The optical pickup device is adopted in compact disk players (CDPs), CR-ROM drives, digital versatile disk players (DVDs) and DVD-ROMs.

FIG. 1 shows the optical arrangement of an optical pickup device manufactured by Sony, a Japanese corporation, as an example of the conventional technology. Referring to the drawing, an optical pickup device includes a light source 10, an objective lens 13 for focusing a main light ray emitted from the light source 10 and branched at a beam splitter 11 in one direction at an optical disk 1, a main photodetector 15 for receiving a light ray reflected by the optical disk 1 and passing the beam splitter 11, and a monitoring photodetector 17 for receiving a sub-light ray branched at the beam splitter 11 in another direction. A collimating lens 12 for focusing an incident light is disposed on an optical path between the beam splitter 11 and the objective lens 13. Also, a holographic optical element 14 for diffracting and transmitting an incident light is installed on the optical path between the beam splitter 11 and the main photodetector 15.

The main photodetector 15 reproduces the input light as a signal. The reproduced signal is determined in proportion to the amount of change in the amount of light output from the light source 10. Thus, to obtain a reproduced signal of high quality, the amount of output light must be maintained constantly. For this purpose, the monitoring photodetector 17 detects the amount of sub-light which is not reflected by the beam splitter 11 and passes through it without change. The information on the detected amount of sub-light is used for control of the amount of output light of the light source 10.

However, in the conventional optical pickup device, the light emitted from the light source 10 diverges at a predetermined angle after being branched at the beam splitter 11 whereas the size of a surface for detecting light of the monitoring photodetector 17 where the divergent light is detected is limited. Thus, the monitoring photodetector 17 cannot detect an amount of sub-light enough to obtain information to effectively control the output light of the light source 10.

SUMMARY OF THE INVENTION

To solve the above problems, it is an objective of the present invention to provide an optical pickup device having an improved structure by which the light emitted from a light source is focused to proceed to a monitoring photodetector.

Accordingly, to achieve the above objective, there is provided an optical pickup device which comprises a light source for emitting light, a beam splitter installed on an optical path of the light emitted from the light source for splitting the light, an objective lens for focusing a main light split by the beam splitter at an optical disk, a monitoring photodetector for receiving a sub-light split by the beam splitter and monitoring the amount of light output from the light source, a main photodetector for receiving the light emitted from the light source and reflected by the optical disk and passing through the beam splitter and detecting an error signal and an information signal, and a collimating lens installed on the optical path between the light source and the beam splitter for condensing both the main light and sub-light split by the beam splitter, so that the amount of light received by the monitoring photodetector increases.

It is preferred in the present invention that a radiation angle of the main light and sub-light passing through the collimating lens is 4°–6°, preferably, 5°.

Also, it is preferred in the present invention that the optical pickup device further comprises a collimating lens, installed between the beam splitter and the optical recording medium, for condensing the main light passing through the beam splitter.

According to another aspect of the present invention, there is provided an optical pickup device which comprises a first light source module for emitting first light having a predetermined wavelength, a second light source module for emitting second light having a wavelength different from that of the first light, a first beam splitter for changing a proceeding path of the first light emitted from the first light source module, a second beam splitter for splitting the second light emitted from the second light source module into a main light and a sub-light and transmitting the first light, an objective lens for focusing the main light split by the second beam splitter and the first light on an optical recording medium, a main photodetector for receiving the light emitted from each of the light source modules, reflected by the optical recording medium, and passing through the beam splitters, and detecting an error signal and an information signal, a monitoring photodetector for receiving the sub-light split by the second beam splitter and monitoring the amount of light output from the second light source module, and a first collimating lens installed on the optical path between the second light source module and the second beam splitter for condensing both the main light and the sub-light split by the second beam splitter by a predetermined angle.

It is preferred in the present invention that the optical pickup device further comprises a second collimating lens installed on the optical path between the second beam splitter and the objective lens for condensing the main light and the first light proceeding toward the objective lens.

Also, it is preferred in the present invention that the first collimating lens condenses the incident second light by a radiation angle of 5°.

BRIEF DESCRIPTION OF THE DRAWINGS

The above objective and advantages of the present invention will become more apparent by describing in detail a preferred embodiment thereof with reference to the attached drawings in which.

DETAILED DESCRIPTION OF THE INVENTION

Figure 2:
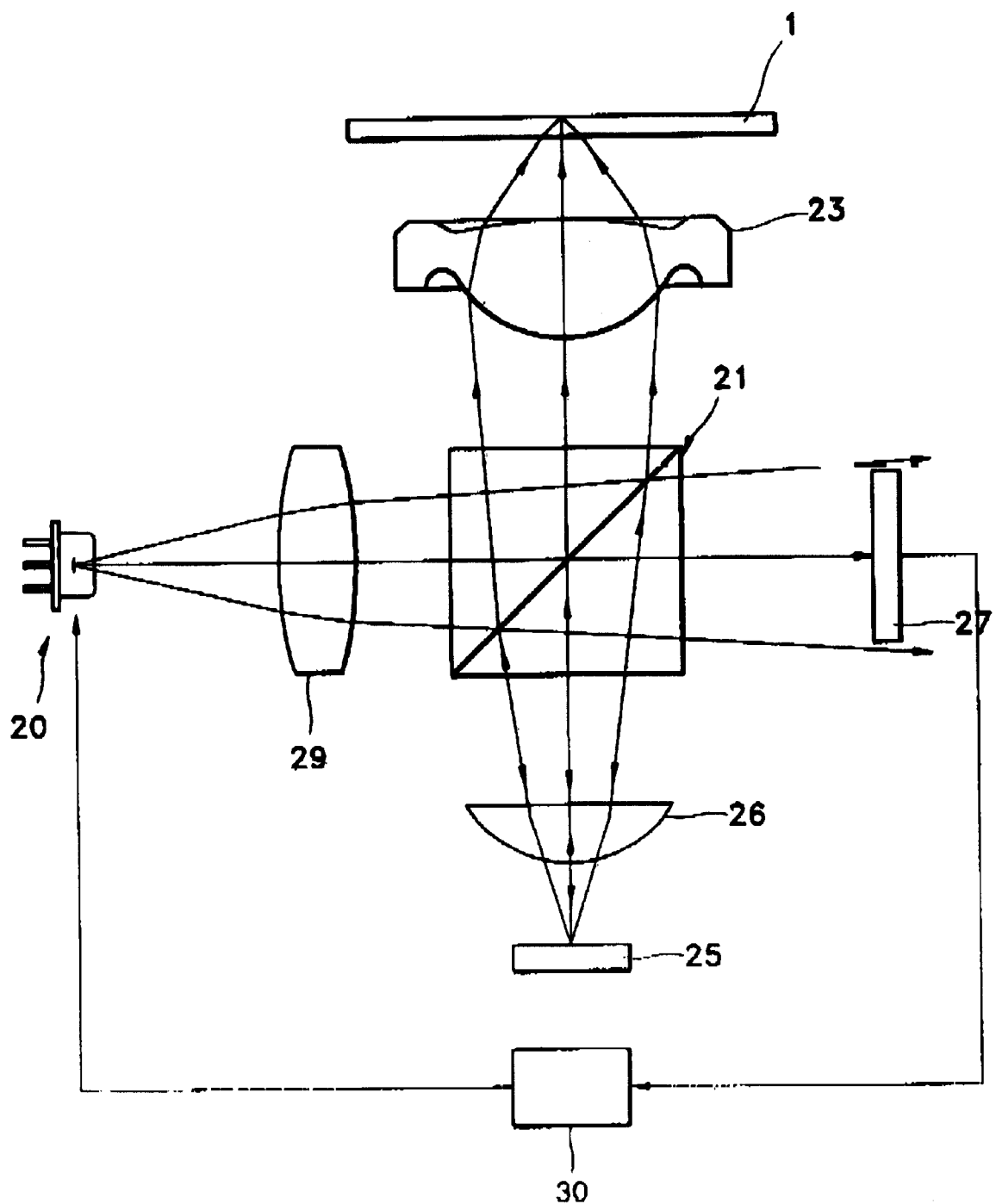
FIG. 2 is a view showing the optical arrangement of an optical pickup device according to a preferred embodiment of the present invention.

Referring to FIG. 2, an optical pickup device according to the present invention includes a light source 20 for emitting light, a beam splitter 21 for splitting the light emitted from the light source 20, an objective lens 23 for focusing a main light L1 split by the beam splitter 21 at an optical disk 1, a main photodetector 25 for receiving and detecting the light reflected by the optical disk 1, a monitoring photodetector 27 for receiving a sub-light L2 split by the beam splitter 21, and a collimating lens 29 for condensing the light emitted from the light source 20.

The beam splitter 21 is installed on an optical path between the light source 20 and the monitoring photodetector 27 and splits the light emitted from the light source 20 into the main light L1 proceeding toward the objective lens 23 and the sub-light L2 proceeding toward the monitoring photodiode 27. The objective lens 23 is installed on the optical path between the beam splitter 21 and the optical disk 1. The objective lens 23 is controlled by a predetermined actuator (not shown) so that light can be focused at a predetermined position of the optical disk 1.

The main photodetector 25 receives the main light L1 reflected by the optical disk 1 and passing through the beam splitter 21 and detects an information signal and an error signal from the received light. Also, a holographic optical element 26 for diffracting and transmitting the light received by the main photodetector 25 is installed on the optical path between the main photodetector 25 and the beam splitter 20. The monitoring photodetector 27 is installed on the optical path of the sub-light L2 emitted from the light source 20 and passing through the beam splitter 21 without change, and detects the amount of the sub-light L2. The monitoring photodetector 27 has an effective area of several mm$^2$ and detects the amount of the sub-light L2 incident on the effective area. The collimating lens 29 is installed on the optical path between the light source 20 and the beam splitter 21, for condensing both the main light L1 and the sub-light L2.

Thus, the sub-light L2 traveling toward the monitoring photodetector 27 proceeds while being focused by a predetermined radiating angle, not being divergent from the light source as in the conventional technology. Here, the collimating lens 29 preferably condenses the light emitted from the light at its own radiation angle to have a radiation angle of about 4°–6°. When the sub-light L2 is condensed, the monitoring photodetector 27 need not enlarge the effective area thereof and can detect more of sub-light L2 then the conventional apparatus with a limited effective area. In particular, when the radiation angle of light condensed by the collimating lens 29 is set to be about 5°, the amount of the sub-light detected by the monitoring photodetector 27 can be improved by about 50% compared to the case when the collimating lens 29 is not installed.

The information about the amount of the sub-light detected by the monitoring photodetector 27 is transmitted to a predetermined optical output control circuit 30. The optical output control circuit 30 controls the light source 20 so that constant light can be emitted from the light source 20 using the transmitted information on the amount of the sub-light. Here, considering the feature that reliability of information needed to control the light output amount of the light source 20 as the amount of the sub-light detected by the monitoring photodetector 27 increases, the optical output control circuit 30 can control the amount of light emitted from the light source 20 more precisely by using reliable information. Thus, reliability of information recorded on or reproduced from the optical disk 1 is improved.

Figure 1:
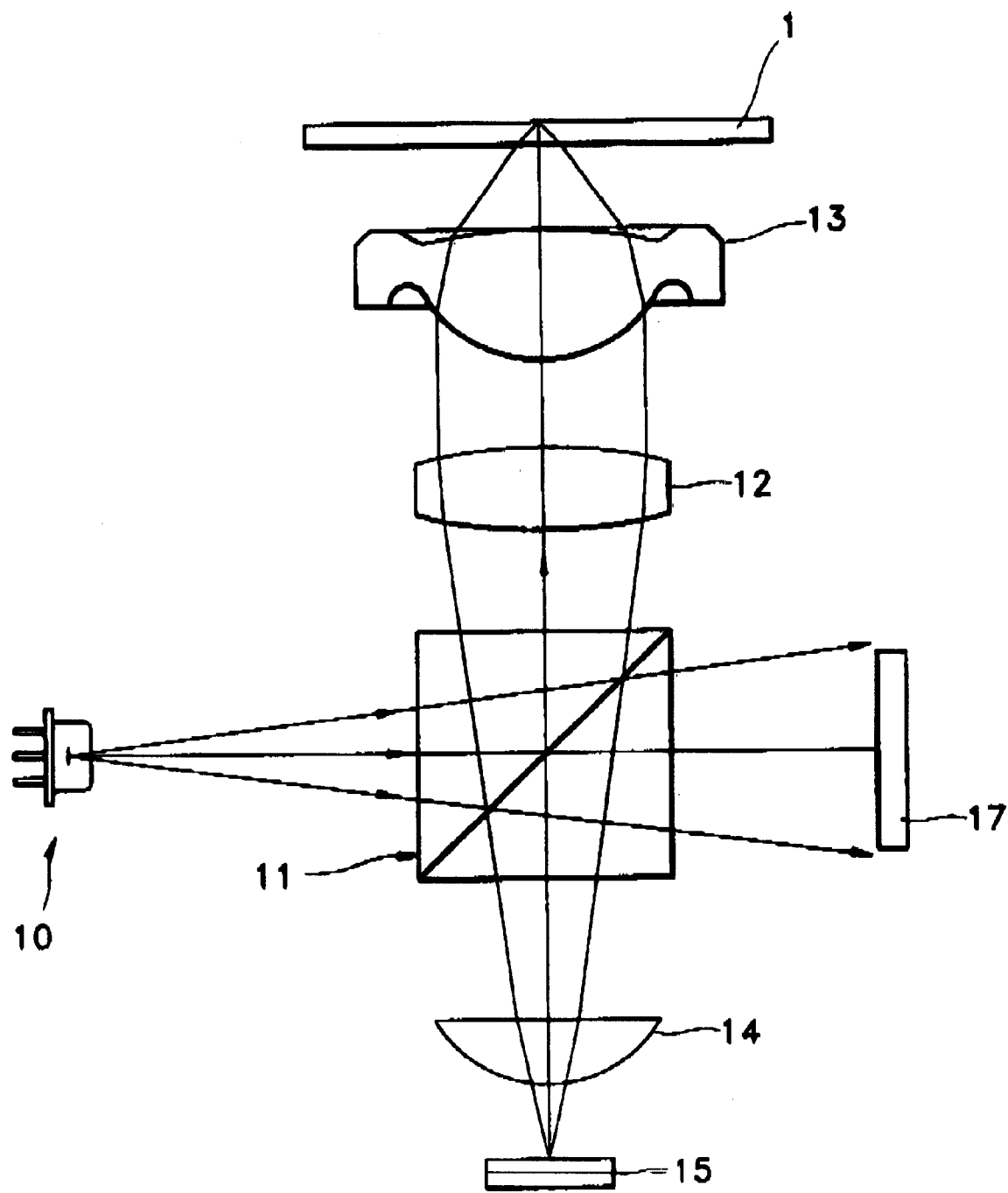
FIG. 1 is a view showing the optical arrangement of a conventional optical pickup device.
Figure 3:
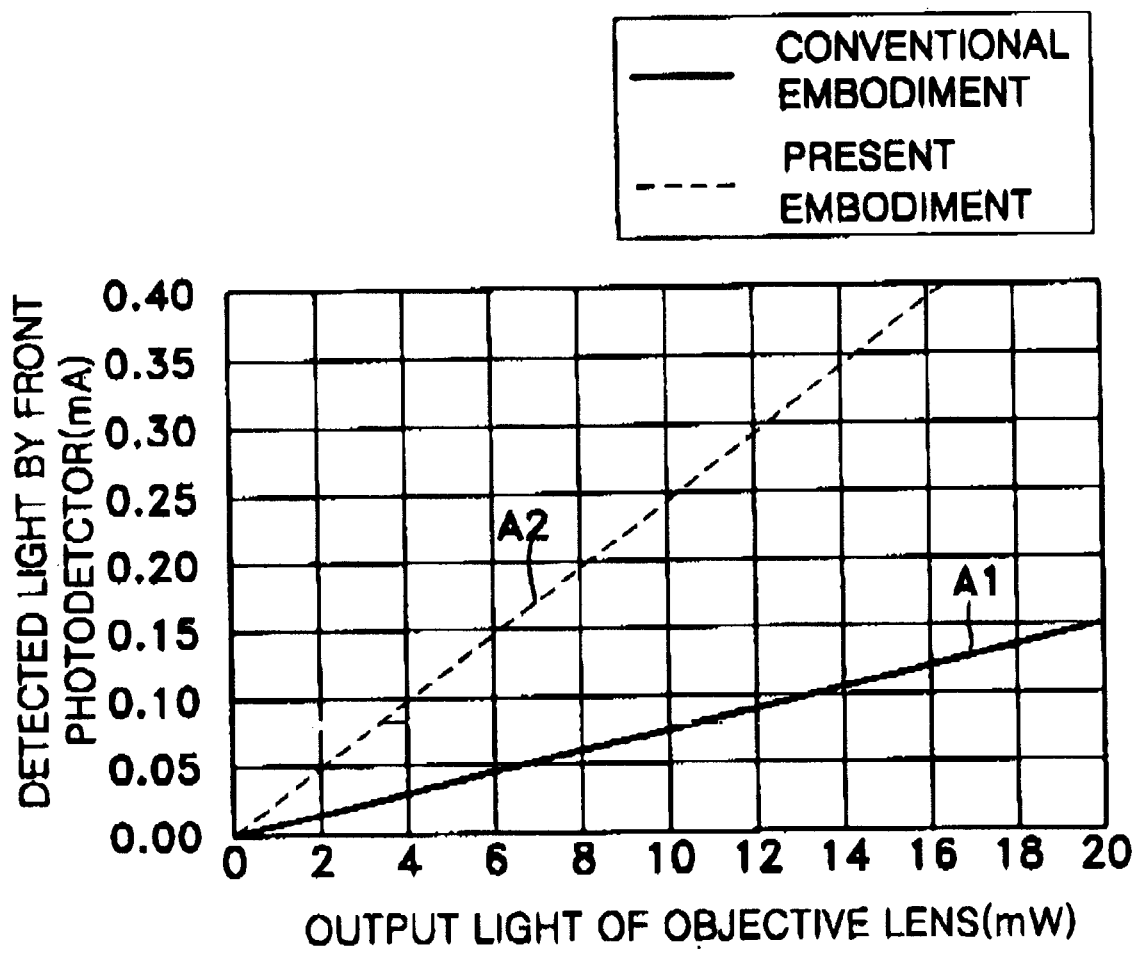
FIG. 3 is graph showing the sensitivity of a monitoring photodetector of the optical pickup device according to the present invention.

The sensitivities of the optical pickup device according to the present invention and the conventional optical pickup device shown in FIG. 1 are compared through experiments. FIG. 3 is a graph showing the results of comparison of the sensitivity (detected light by monitoring photodetector/output light of objective lens) of each of the conventional technology and the optical pickup device of the present invention using a monitoring photodetector of a S3321-04 model manufactured by Hamamats, a Japanese corporation.

As can be seen from the drawing, the sensitivity A1 of the monitoring detector according to the conventional technology is about 0.075 mA/mW whereas the sensitivity A2 of the monitoring detector according to the present invention is 0.02 mA/mW, which is remarkably higher than in the conventional technology.

The detailed result can be seen by the amount of the sub-light detected in the effective areas of the monitoring photodetectors 17 (see FIG. 1) and 27 in a state in which the radiation angle of each of the light sources 10 (see FIG. 1) and 20 is equally set to 10° and 24° and the overall amount of light emitted from each of the light sources 10 and 20 is maintained to be about 2054 as a simple comparison value. The result thereof is shown in Table 1 below.

TABLE 1

|  | Preferred Embodiment | Compared Example (Sony Corporation) |
| --- | --- | --- |
| Amount of Light Emitted from Light Source | 2054 | 2054 |
| Angle of Radiation at Light Source | 10°, 24° | 10°, 24° |
| CL Lens | present | does not present |
| Type of FPD | S3321-04 (Hamamats Corporation) | S3321-04 (Hamamats Corporation) |
| Amount of Sub-light Detected by FPD | 934 | 385 |
| Rate of Amount of Sub-light of FPD | 45.5% (934/2054) | 18.7% (385/2054) |

As can be seen in Table 1, the amounts of the sub-light measured at the monitoring photodetectors 17 and 27 are 385 in the compared example and 934 in the preferred embodiment according to the present invention. Thus, the ratio B1 of the amount of the sub-light in the compared example is 18.7% (385/2054) whereas the rate B2 of the amount of the sub-light in the preferred embodiment according to the present invention is 45.5% (934/2054). It can be seen that the ratio of B1 to B2 is 18.7:45.5=1:2.4. Thus, since the sensitivity of detection of the amount of the sub-light in the present embodiment is about 2.4 times higher than that of the compared example, more reliable optical output control information can be obtained from the optical output control circuit 30.

Also, the efficiency of light transmissivity of the holographic optical element 26 is substantially about 0.85. Accordingly, to make the efficiency of light transmissivity of the holographic optical element 26 to be 1, the optical output of the light source 20 is increased by about 1.18 times. Thus, the final amount of light detection by the monitoring photodetector 27 is actually 2.8 (B2×1.18) which is about 2.8 times higher than that of the compared example. By increasing the amount of detection of the sub-light by installing the collimating lens 29, designing the position of the monitoring photodetector 27 is not limited compared to the conventional technology.

Also, the amount of detection of the sub-light considerably varies when either the light source 20 is moved over about 0.5 mm or the collimating lens 20 is moved over about 1 mm. Thus, considering that there is allowance in assembly of each optical devices, the optical pickup device according to the present invention is advantageous in that a better sub-light detection efficiency than the conventional optical pickup device. Thus, by controlling the optical output of the light source effectively, reliability of information being reproduced or recorded can be improved.

Figure 4:
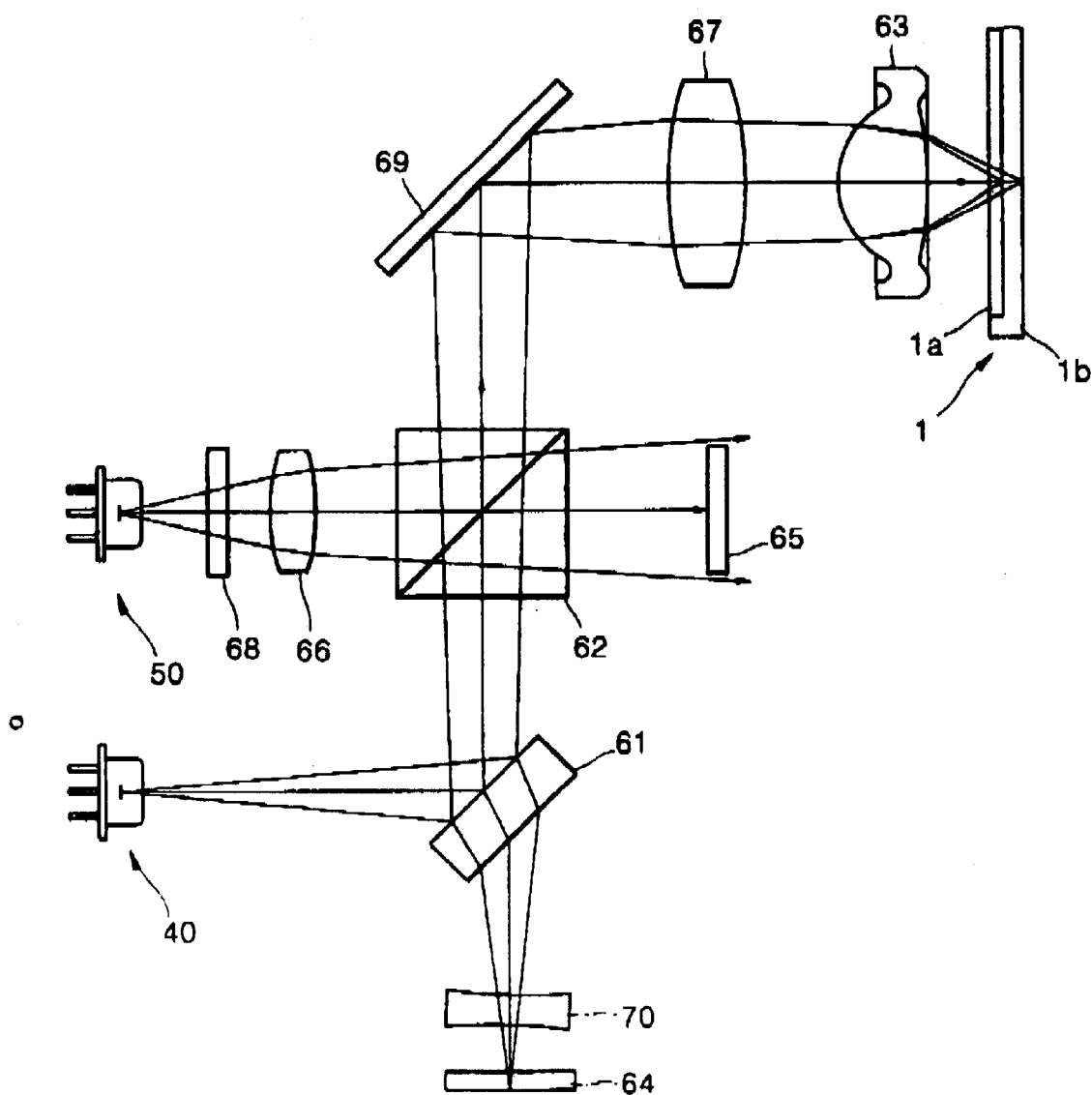
FIG. 4 is a view showing the optical arrangement of an optical pickup device according to another preferred embodiment of the present invention.

FIG. 4 shows the optical arrangement of an optical pickup device according to a preferred embodiment of the present invention. Referring to the drawing, the optical pickup includes first and second light source modules 40 and 50 for emitting light having different wavelengths, first and second beam splitters 61 and 62 for altering the proceeding path of the light emitted from the first and second light source modules 40 and 50, a objective lens 63 for focusing incident light on a disk 1, a main photodetector 64 for receiving incident light reflected by the disk 1 and passing through the second beam splitter 62 and the first beam splitter 61, a monitoring photodetector 65 for detecting sub-light L2 emitted by the second light source module 50 and split by the second beam splitter 62, a first collimating lens 66 for primarily condensing the light emitted from the second light source module 50, and a second collimating lens 67 for condensing the light incident on the objective lens 63.

The first light source module 40 is for a relatively thin disk 1a, for example, for a DVD, and emits light having about 650 nm wavelength. The second light source module 50 is for a relatively thick disk 1b, for example, for a CD family, and emits light having about 780 nm wavelength.

The first light source module 40 includes a predetermined light source which is not shown, and a monitoring photodetector, installed to the rear of the light source, for monitoring the optical output of the light source by receiving the light emitted by the light source. Since the configuration of the first light source module 40 is well-known in this field, a description thereof is omitted.

The second light source module 50 has substantially the same configuration as that of the first light source module 40. However, the second light source module 50 is distinguished from the first light source module 40 in that the monitoring photodetector 65 for monitoring the optical output of the second light source module 50 is disposed on the optical path of the sub-light L2, and that the wavelength of the light emitted is different.

The first beam splitter 61 is a flat panel structure and reflects the light emitted from the first light source module 40 to proceed toward the second beam splitter 62. The second beam splitter 62 has a cubic structure having a mirror surface to transmit or reflect incident light.

Thus, the light emitted from the first light source module 40 is reflected by the first beam splitter 61 and passes through the second beam splitter 62 to proceed toward the optical disk 1. The light emitted from the second light source module 50 is split into main light L1 proceeding toward the objective lens 63 after being reflected by the second beam splitter 62, and sub-light L2 proceeding toward the monitoring photodetector 65 after passing though the second beam splitter 62. The main light L1 is focused on the optical disk 1 by the objective lens 63.

Here, a grating 68 for diffracting incident light and the first collimating lens 66 are installed on the optical path between the second light source module 50 and the second beam splitter 62. The first collimating lens 66 condenses the light emitted from the second light source module 50 at a predetermined radiation angle to increase the amount of sub-light detected in the effective area of the monitoring photodetector 65. Also, the first collimating lens 66 preferably condenses the incident light at a radiation angle of about 5° considering the secondary light condensation by the second collimating lens 67.

The monitoring photodetector 65 detects the sub-light L2 to obtain information to control the optical output of the second light source module 50. Here, since the monitoring photodetector 65 detects the sub-light L2 of the second light source module 50 condensed at a predetermined radiation angle, more amount of light is detected with a particular effective area than when the first collimating lens 60 is not present.

Also, considering the optical arrangement, a reflection mirror 69 for reflecting incident light and the second collimating lens 67 are disposed on the optical path between the second beam splitter 62 and the objective lens 63. The second collimating lens 67 condenses the light emitted from the first and second light source modules 40 and 50 to be a parallel light beam to proceed toward the objective lens 63. That is, the second collimating lens 67 secondarily condenses the main light L1, primarily condensed at the first collimating lens 66 and split by the second beam splitter 62, to be a parallel light beam.

The main photodetector 64 receives light reflected by the disk 1 among the light emitted from the first and second light source modules 40 and 50, and detects a reproduction signal (a radio frequency signal) and an error signal. Also, a sensor lens 70 is further installed on the optical path between the main photodetector 64 and the first beam splitter 61.

The optical pickup device according to another preferred embodiment of the present invention having the above structure includes two light source modules for outputting light having different wavelengths so as to compatibly adopt recording medium having different formats. In particular, like the optical pickup device shown in FIG. 2, by condensing the light emitted from the second light source module 50 to proceed toward the monitoring photodetector 65, the sensibility in light detection of the monitoring photodetector 65 can be sharply increased. Thus, accurate information needed to constantly control the optical output of the second light source module 50 can be easily obtained. Also, since allowance of an installation error of the monitoring photodetector 65 and the second light source 50 can be increased, a defective proportion is lowered.

As described above, according to the optical pickup device according to the present invention, since the collimating lens is installed between the light source and the beam splitter, the amount of the sub-light detected by the monitoring photodetector increases. Thus, since the light source is effectively controlled to have a constant amount of optical output, reliability of recorded/reproduced information is improved.

Furthermore, since the amount of the sub-light detected by the monitoring photodetector increases, change in the sub-light amount due to an installation error of the light source and the monitoring photodetector can be corrected, so that a defective proportion can be lowered.

What is claimed is:

1. An optical pickup device comprising:
   a light source for emitting light;
   a beam splitter installed on an optical path of the light emitted from the light source for splitting the light;
   an objective lens for focusing a main light split by the splitter on an optical recording medium;
   a monitoring photodetector for receiving a sub-light split by the beam splitter and monitoring the amount of light output from the light source;

a main photodetector for receiving the light emitted from the light source and reflected by the optical recording medium and passing through the beam splitter and detecting an error signal and an information signal; and a collimating lens installed on the optical path between the light source and the beam splitter for focusing both the main light and sub light split by the beam splitter, so that the amount of light received by the monitoring photodetector increases, wherein a radiation angle of the main light and sub-light passing through the collimating lens is 4°–6°.

2. The optical pickup device as claimed in claim 1, wherein a radiation angle of the main light and sub-light passing through the collimating lens is 5°.

3. The optical pickup device as claimed in claim 1, further comprising a collimating lens, installed between the beam splitter and the optical recording medium, for condensing the main light passing through the beam splitter.

4. The optical pickup device as claimed in claim 3, further comprising a collimating lens, installed between the beam splitter and the optical recording medium, for condensing the main light passing through the beam splitter.

5. An optical pickup device comprising:

a first light source module for emitting first light having a predetermined wavelength;

a second light source module for emitting second light having a wavelength different from that of the first light;

a first beam splitter for changing a proceeding path of the first light emitted from the first light source module;

a second beam splitter for splitting the second light emitted from the second light source module into a main light and a sub-light and transmitting the first light;

an objective lens for focusing the main light split by the second beam splitter and the first light on an optical recording medium;

a main photodetector for receiving the light emitted from each of the light source modules, reflected by the optical recording medium, and passing through the beam splitters, and detecting an error signal and an information signal;

a monitoring photodetector for receiving the sub-light split by the second beam splitter and monitoring the amount of light output from the second light source module; and a first collimating lens installed on the optical path between the second light source module and the second beam splitter for condensing both the main light and the sub-light split by the second beam splitter by a predetermined angle.

6. The optical pickup device as claimed in claim 5, further comprises a second collimating lens installed on the optical path between the second beam splitter and the objective lens for condensing the main light and the first light proceeding toward the objective lens.

7. The optical pickup device as claimed in claim 5, wherein the first collimating lens condenses the incident second light by a radiation angle of 5°.

8. The optical pickup device as claimed in claim 6, wherein the first collimating lens condenses the incident second light by a radiation angle of 5°.

* * * * *